United States Patent [19]

Epstein

[11] 3,965,270

[45] June 22, 1976

[54] METHOD OF FREEZING COOKED EGGS

[75] Inventor: Jacob J. Epstein, Topeka, Kans.

[73] Assignee: Seymour Foods, Inc., Topeka, Kans.

[22] Filed: Aug. 12, 1974

[21] Appl. No.: 496,455

[52] U.S. Cl. .................................. 426/418; 62/64; 426/298; 426/393
[51] Int. Cl.² ........................ A23L 1/32; C12C 3/04
[58] Field of Search ........... 426/298, 299, 300, 393, 426/524, 418, 148, 211, 327, 348; 62/62, 64, 60, 374

[56] References Cited
UNITED STATES PATENTS

| | | | |
|---|---|---|---|
| 2,813,800 | 11/1957 | Rasky | 426/393 |
| 2,976,695 | 3/1961 | Meade | 62/430 X |
| 3,368,363 | 2/1968 | Alaburda et al. | 62/374 |
| 3,413,818 | 12/1968 | Pelmulder | 62/374 |
| 3,479,833 | 11/1969 | Waldin | 62/374 |
| 3,510,315 | 5/1970 | Hawley | 426/211 |
| 3,664,146 | 5/1972 | Butts | 62/63 |
| 3,857,974 | 12/1974 | Aref et al. | 426/148 |

Primary Examiner—William F. O'Dea
Assistant Examiner—Ronald C. Capossela
Attorney, Agent, or Firm—Robert M. Ward

[57] ABSTRACT

A method of freeze treating a cooked egg product which does not result in substantial changes in the physical or chemical characteristics of the later thawed product, which method comprises immersing and retaining the cooked egg product in a bath of a liquid freezing medium for a relatively short predetermined period while the freezing medium is held at a temperature within the range of approximately 0°F to approximately −325°F.

9 Claims, 1 Drawing Figure

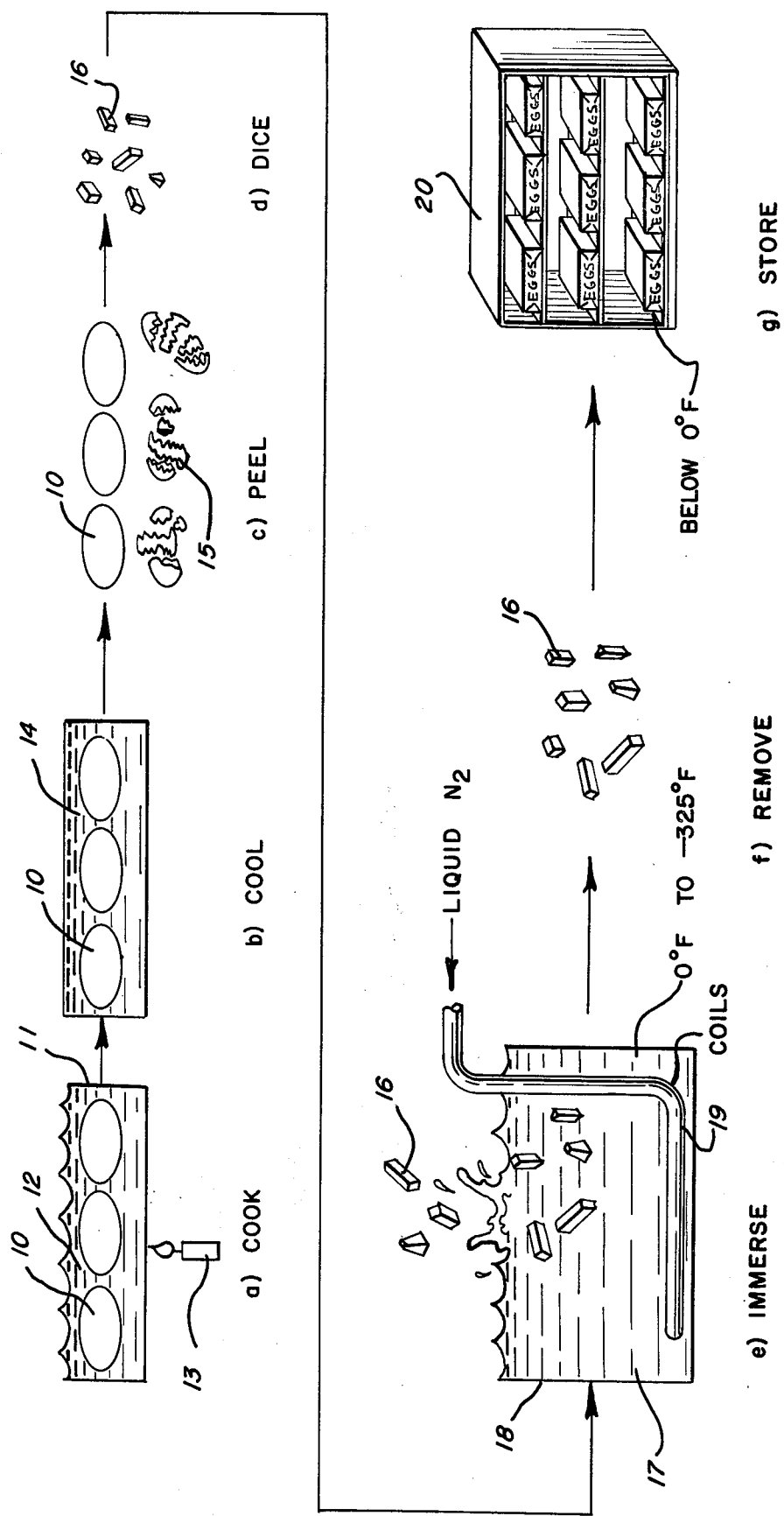

METHOD OF FREEZING COOKED EGGS

BACKGROUND OF THE INVENTION

The present invention relates generally to methods of preserving cooked egg products. More specifically, the present invention concerns preservation of a cooked egg product by immersion thereof in a liquid bath at specified temperatures over a relatively short predetermined period of time.

In the commercial production of cooked egg products, such as hard boiled eggs or other hard cooked eggs and the like, it is frequently desirable to be able to store the cooked product for an extended period of time in such a manner as to preserve its physical and chemical characteristics thereby to retain the desirable characteristics of the freshly cooked product. Various methods of treating such egg products have been suggested when it is desirable or necessary to store the product for use at a later time, some of which methods have been practiced commercially.

A number of the methods of the prior art involve the use of additives of various kinds. Other methods, some employed commercially, involve the use of conventional freezing techniques, with or without additives. Most of these commercial or suggested practices of the prior art in treating the cooked product have not been satisfactory for most applications because they result in an alternation of the texture and consistency of the gel structure of the egg white to an extent which renders the white unpalatable or otherwise unsatisfactory for use in egg salads or the like.

It is known that the delicate gel structure of the cooked egg white holds substantial amounts of water. Approximately three-quarters of the water held by the gel structure formed by heat-denaturing the egg white protein is chemically free water which, under freezing techniques of the prior art, such as have been typically used in connection with the freezing of most food products, at low temperatures forms relatively large ice crystals. When such freezing is done slowly, these crystals are of sufficiently large size to disrupt the protein gel structure. Also ice crystal formation which is not uniform from the surface to the interior of the material frozen will likewise disrupt the protein gel structure. In either case, this disruption causes the release of free water, such that the egg whites upon thawing may be said to "weep." This syneresis or "weeping" results in a product which is generally unsatisfactory for consumption in such dishes as egg salad, for example.

Another manifestation of the disturbance and alteration of the gel structure resulting from the use of prior art freezing techniques is the marked change in the texture and consistency of the thawed egg white product. The tough, fibrous and/or chewy character of egg whites frozen using prior art techniques is in marked contrast to the tender and palatable character of the freshly cooked egg product, or of the egg product treated by the method of the present invention.

Other prior art attempts to create a frozen egg product comparable to the freshly cooked product have involved the addition of various chemicals prior to freezing in an attempt to alter or stabilize the gel structure present. These teachings have generally been unsatisfactory for a variety of reasons. Either the additive used must itself be edible, or means must be provided to remove it prior to consumption. In either case an added expense is incurred. Also in either case, the safety of such additives may be seriously in question.

BRIEF SUMMARY OF THE INVENTION

The present invention involves the freeze treating of a shelled cooked egg product which can be satisfactorily stored in the frozen state for a period of time. Upon thawing, the physical and chemical characteristics of the egg product are substantially unchanged from those of the freshly cooked, pre-treated state.

The method of the present invention is practiced by immersing and retaining the egg product in a liquid bath maintained at a relatively low temperature. The liquid bath may be successfully operated to produce a commercially acceptable product at temperatures of approximately 0°F to approximately −325°F. At the lower temperature levels of the egg product need only be held in immersion for a period of approximately one minute or less, depending on the particular temperature used and the size of the particles of egg product to be treated. At the upper functional limit of the temperature range of the present invention, up to approximately two minutes may be required for satisfactory treatment. Bath temperatures much above approximately 0°F result in an unsatisfactory product, which is similar in properties to that produced by prior art techniques. The temperature range of approximately −10°F to approximately −50°F is considered optimal from an economic view, since low bath tempertures would necessitate the use of addtitional equipment, as well as greater quantities of a coolant such as liquid nitrogen, which is more expensive than other refrigerants which may be used in association therewith.

The substance comprising the liquid bath may be liquid nitrogen, for very low temperatures, or a physical mixture of liquid nitrogen, monofluorotrichloromethane (Freon 11) and/or difluorodichloromethane (Freon 12). Freon 11 and 12 are trademarks of the I. E. DuPont-DeNemours and Co., Wilmington, Delaware. These materials are also commercially available from Allied Chemical Corp., Morristown, New Jersey under the trademark Genetron. Alternatively, refrigerants such as Freon 11, Freon 12 or mixtures thereof, may be cooled by circulating liquid nitrogen or other extremely cold liquid through coils immersed in the selected refrigerant without any physical mixing of the liquid nitrogen with the selected refrigerant(s). Generally, the refrigerant(s) used should be relatively inert with respect to the cooked egg product, e.g., relatively colorless, odorless and tasteless. It should also be nonflammable, low in toxicity and low in viscosity. Furthermore, the refrigerant selected should be relatively water immiscible, so that no hindrance is presented to freezing the water in the gel structure of the cooked egg white. It would also be advantageous for the refrigerant selected to boil within the temperature range used to increase heat absorption from the egg product, although this characteristic is not regarded as essential. Liquid nitrogen and Freon 11 and 12, with or without physical mixing with liquid nitrogen, are regarded as having satisfactory characteristics for a liquid bath in accordance with the method of the present invention.

BRIEF DESCRIPTION OF THE DRAWING

The FIGURE 1 is a diagrammatic, semi-schematic representation of the steps comprising the present invention along with prior art steps illustrating certain preliminary measures taken to prepare the egg product for treatment by the method of the present invention.

DESCRIPTION OF THE PREFERRED EMBODIMENTS

The method of the present invention may be better understood and its relationship to the prior art more sharply delineated by reference to the accompanying diagrammatic drawings.

Referring now more particularly to FIGS. 1(a)–(d) which diagrammatically illustrate typical prior art steps of preparing an egg product suitable for practicing the method of the present invention, eggs 10 are placed in cooker 11 and covered with water 12. A heat source 13 is provided in order to heat water 12 to a sufficient temperature and for a sufficient period of time to heat-denature the proteinacous structure of the egg white and egg yolk, a procedure commonly referred to as "cooking." Typically, temperature of approximately 212°F for periods of approximately 10 to 15 minutes are sufficient. The time for cooking may vary depending upon: (1) the number of eggs to be cooked, i.e., the extent of loading; (2) the size of the eggs; and (3) the internal temperature of the eggs immediately prior to cooking. Other means of cooking eggs well known to those skilled in the art may alternatively be utilized.

Referring to FIG. 1(b), eggs 10 prefereably are cooled preparatory to subsequent processing steps. Cool water 14 provides more rapid cooling than cooling in air, prevents overcooking caused by retention of internally present residual heat, and also prevents formation of the nonaesthetic, black ferrous sulfide coating on the yolk surface.

Next, referring to FIG. 1(c), after eggs 10 have cooled to less than room temperature, they may be peeled of their shells 15 by hand or by machine. It is generally necessary to cool eggs 10 prior to shelling in order to permit the egg white to toughen sufficiently to retain its shape and integrity upon peeling.

The final preparatory step, as illustrated in FIG. 1(d) is the dicing of eggs 10 into egg product 16 into particles preferably of a size generally regarded by those skilled in the art as desirable for use in preparing egg salad, although the size of the individual egg particles is not regarded as limiting the present invention. It should be particularly re-emphasized at this point that the steps illustratively set forth in FIGS. 1(a)-(d) are regarded as old in the art and do not form a part of the present invention, per se. Many variations or alternative methods of preparing a shelled, cooked egg may be utilized to provide a product whose preservation is suitably accomplished by the method of the present invention.

Referring now to FIGS. 1(e)-(g), which pictorially illustrate the steps comprising the method of the present invention, cooked egg product 16 is immersed and retained in liquid bath 17, which is maintained at a temperature within the range of approximately 0°F to approximately –325°F, until frozen throughout. Typically, approximately one minute is sufficient for this purpose, although in the upper limits of the temperature range disclosed up to two minutes may be desirable. Liquid bath 17 is contained within freezer bucket 18, which may be provided with heat exchanger coils 19 disposed therein. Liquid nitrogen may be pumped into such coils 19 to cool liquid bath 17. Alternatively, liquid nitrogen or various combinations of liquid nitrogen with such refrigerants as Freon 11 and/or Freon 12 may be used to comprise the liquid bath.

Next, frozen egg product 16 is removed from liquid bath 17. Before frozen egg product 16 is permitted to thaw, it is transferred to a storage environment 20, the temperature of which is constantly maintained at a level of less than 0°F. A commercial freezer or the freezer unit is standard household refrigerator will suffice to store the frozen egg product until the consumer wishes to utilize it. After thawing, the frozen egg product may be used in any manner in which the frozen cooked product could have been used.

The method of the present invention may be better understood with reference to the preferred embodiments set forth in the following Examples, although no unnecessary limitation is intended to be presented by the inclusion of a specific Example herein:

EXAMPLE 1

Three dozen medium sized eggs were cooked sufficiently to denature all the protein of the egg white and yolk by boiling, using 150 ml. of water per 8 egg cook. The cooked eggs were then cooled in ice water until their temperatures were approximately 50°F. After they had been shelled by hand, they were diced with a small capacity of commercial egg dicing apparatus and weighed into individual portions of 150 grams each.

An insulated freezer bucket was filled sufficiently with liquid nitrogen such that the basket contained therein could be completely submerged. A 150 gram sample of cooked, diced egg was placed in the basket and the cooked egg product was totally immersed in the liquid nitrogen for one minute. The temperature of the liquid nitrogen was –325°F. The frozen egg product was removed from the basket and stored in a commercial freezer at temperatures below 0°F for several days.

The sample was then thawed. Upon thawing, the egg white and egg yolk particles were observed to be fragmented. Egg salad was then prepared by mixing the thawed egg product with mayonnaise. When the egg salad was completely mixed, no discrete egg yolk particles were in evidence and the dispersion of cooked yolk material in the mayonnaise appeared to be complete. The texture of the egg whites was indistinguishable from that of the freshly cooked egg product. Upon taste examination, no foreign odor or taste appeared.

EXAMPLE 2

After the sample in Example 1 had been frozen, the liquid nitrogen was removed from the freezer bucket and replaced with Freon 12. A heat exchanger consisting of 50 feet of ½ inch copper tubing coiled in a spiral was immersed in the Freon 12. The temperature of the Freon 12 was reduced to –235°F by discharging liquid nitrogen into the submerged heat exchanger. A 150 gram sample of cooked egg product was placed in the freezer basket and completely immersed in the Freon 12 for 1 minute. Although a slight amount of Freon 12 and the bottom of the bucket became solid, that portion of the Freon 12 which came into contact with the cooked egg sample remained liquid. The frozen egg sample was stored and evaluated by the techniques described in Example 1 with substantially the same results.

EXAMPLE 3

An additional 150 gram sample of cooked egg product was serially frozen and stored according to the method disclosed in Example 2. The temperature of the Freon 12 during freezing was measured at −249°F. The results were substantially the same as in the foregoing Example. The thawed product was very similar to freshly cooked product in appearance, texture, taste and odor.

EXAMPLE 4

Approximately one-third of the Freon 12 was removed from the freezer bucket used in the foregoing Examples, to be used as a refrigerant in later Examples. The remaining Freon 12 was permitted to warm at room temperature, which was measured at 75°F. Warming was facilitated by passing warm compressed air through submerged coils. When the temperature reached −195°F, a 150 gram sample of cooked egg product was immersed therein for two minutes and then removed. The temperature of the Freon 12 was then measured to be −180°F. The results were substantially the same as in the foregoing Examples.

EXAMPLE 5

After the egg sample of the previous Example had been removed from the freezer bucket, the Freon 12 contained therein was permitted to warm further. When the measured temperature of Freon 12 was −152°F, a 150 gram sample of egg product was immersed therein for one and a quarter minutes. The frozen product was then removed and stored as in the prior Examples. The temperature of the Freon 12 upon the removal of the sample was −125°F. After storage for 5 days, it was thawed and evaluated. Again, the results of that evaluation were very similar to those samples of the foregoing Examples.

EXAMPLE 6

The Freon 12 in the freezer bucket was permitted to warm to −127°F. A 150 gram sample of egg product was immersed therein for 1 minute and the frozen product removed. The temperature of the Freon 12 was measured to be −119°F. The sample was stored for 5 days and evaluated. The thawed egg product was found to be very similar to the freshly cooked egg product.

EXAMPLE 7

The Freon 12 in the freezer bucket was permitted to warm to −60°F. A 150 gram sample of egg product was immersed therein for one minute. The frozen product was removed and stored for 5 days by techniques described in the foregoing Examples. Upon removal of the frozen product, the bath temperature was measured to be −59°F. After storage, it was thawed and evaluated. The resulting thawed product was found to be very similar to the freshly cooked egg product.

EXAMPLE 8

The Freon 12 in the freezer bucket was permitted to warm to −28°F. A 150 gram sample of egg product was immersed therein or one minute. The frozen product was removed and stored for five days by techniques described in the foregoing Examples. Upon removal of the frozen product, the bath temperature was measured to be −26°F. Upon thawing and evaluating the thawed product was found to be very similar to the freshly cooked egg product.

EXAMPLE 9

Freon 11 was placed in a vessel different from that used to carry out the above Examples. The vessel used herein was not insulated and its capacity was reduced to save Freon 11 by using two concentrically disposed kitchen strainers as a freezing bucket. The two kitchen strainers were secured together by trying their loop-like handles together with copper wire.

Enough Freon 12, which had been removed from the freezer bucket as pointed out in Example 4, supra, was directly added to and mixed with the Freon 11 to adjust the temperature thereof to 0°F. The two materials mixed without and physical change in the appearance of either the Freon 11 or of the mixture. At 0°F, which is about 20°F above the boiling point of Freon 12, the amount of boiling of the mixture was rather meager. A 150 gram sample of egg product was immersed therein for 2 minutes, removed and stored. The temperature of the Freon 11/Freon 12 mixture was measured to be +5°F upon removal of the sample. Evaluation of the product, which had been freezer stored for 4 days, yielded results very similar to freshly cooked product.

EXAMPLE 10

Additional cold Freon 12 was added to the Freon 11/Freon 12 mixture to bring the temperature thereof to −24°F. A 150 gram sample of egg product was immersed therein for 2 minutes. The resulting frozen product was then removed and the temperature of the bath was measured to be −17°F. The frozen product was stored for 4 days under conditions set forth hereinabove and thawed. Evaluation showed that the properties of the thawed product was very similar to those of freshly cooked product.

EXAMPLE 11

Still further Freon 12 was added to the Freon 11/Freon 12 mixture of Example 10 until the temperature was −44°F. A 150 gram sample of egg product was immersed therein for 2 minutes. The resulting frozen product was then removed. The temperature of the bath was found to be −42°F. The frozen product was then stored in a freezer for 5 days, thawed and evaluated. The properties of the thawed sample, as above, were found to be very similar to those of the freshly cooked egg product.

The only difference noted between the samples frozen at relatively higher temperatures was a greater percentage of discrete egg yolk particles and larger white particles in the egg salad prepared therefrom.

EXAMPLE 12

A quantity of Freon 11 was placed in a container and cooled to +15°F. A 150 gram sample of egg product prepared in the manner disclosed hereinabove was immersed therein for one and a quarter minutes and then removed. The temperature of the bath was measured at +21°F. The frozen product was not stored, but instead was thawed immediately and visually observed. The egg white appeared dull and the egg yolk was somewhat blanched and thus generally unsatisfactory for consumption. It was apparent that in the temperature range used, i.e., +15°F to +21°F, Freon 11 acts as a solvent for egg yolk oil.

EXAMPLE 13

The procedure of Example 12 was carried out over the temperature range of +4°F to +11°F. The results were equally unsatisfactory.

EXAMPLE 14

Approximately 300 grams of egg yolk solids was repeatedly dispersed in Freon 11 until no further evidence of egg yolk oil extraction was present. The purpose of adding egg yolk solids to the Freon 11 was to saturate it with yolk oil so the solvent effect of the Freon 11 on the yolk at higher temperatures would be minimized. This yields a more uniform more representative of a longer run with this heat transfer medium. The thus treated Freon 11 was used to freeze a 150 gram sample of egg product prepared as above. The egg product was immersed for two minutes at a temperature range of +1°F to +11°F. The frozen egg product was thawed without storage and evaluated. The egg white was found to be tough and fibrous with sufficient water oozing therefrom to make the evaluative egg salad prepared therefrom somewhat fluid and, hence, unacceptable.

EXAMPLE 15

The techniques of the foregoing Example were utilized to freeze a 150 gram sample of egg product. The freezing temperature range was +12°F to +21°F. The egg product was immersed for three minutes. The results were equally unsatisfactory.

From the foregoing Examples it is clear that freshly cooked egg product may be successfully frozen, stored, thawed and used, if the freezing temperature of the bath is less than approximately 0°F. Generally, 1 minute of submersion is sufficient, especially at lower temperatures, although the period of immersion only need to be long enough to completely freeze the sample. The particular liquids used to constitute the freezing bath in the foregoing Examples are not regarded as limitations on the invention hereof, as long as the material used remains liquid over the temperature range desired to be used, is relatively water immiscible, has low viscosity, is expensive, not toxic, is relatively inert with respect to egg white and egg yolk, is relatively odorless, tasteless and colorless in the thawed product and does not serve as a solvent for egg yolk oil in the specified temperature range of the method of the present invention. The use of liquid-solid freezing techniques as opposed to gas-solid freezing techniques taught by the prior art, is regarded as a critical limitation. Also the Examples herein reveal that the upper temperature limit of approximately 0°F is a critical limitation for satisfactory freezing of an egg product. However, the lower temperature limit of approximately −325°F is not regarded as critical per se, since other even more expensibe, inert substances, such as helium, which has an even lower boiling point than liquid nitrogen, could be used.

What is claimed is:

1. A method of freeze treating a shelled, cooked egg whereby said egg may be stored satisfactorily and upon thawing said has physical and chemical characteristics substantially unchanged from the freshly cooked condition of said egg said method comprising:

immersing and retaining said egg in a liquid bath, the temperature of which is maintained at from approximately 0°F to approximately −325°F, until said egg is frozen;

removing said frozen egg from said bath; and storing said frozen egg at temperatures below approximately 0°F.

2. The method claimed in claim 1 wherein said egg is retained in said liquid bath for at least approximately one minute.

3. The method claimed in claim 1 wherein said liquid bath is maintained during treatment of said egg at a temperature ranging from approximately −10°F to approximately −50°F.

4. The method claimed in claim 1 wherein said liquid bath comprises a relatively inert, low viscosity, relatively water immiscible substance.

5. The method claimed in claim 4 wherein said relatively inert, low viscosity, relatively water immiscible substance is monofluorotrichloromethane.

6. The method claimed in claim 4 wherein said relatively inert, low viscosity, relatively water immiscible substance is difluorodichloromethane.

7. The method claimed in claim 1 wherein said liquid bath comprises liquid nitrogen.

8. The method claimed in claim 1 wherein said liquid bath comprises a mixture of monofluorotrichloromethane, difluorodichloromethane and liquid nitrogen.

9. The method claimed in claim 1 wherein said liquid bath further includes heat exchanger means for cooling said liquid bath.

* * * * *

UNITED STATES PATENT OFFICE
CERTIFICATE OF CORRECTION

Patent No. 3,965,270  Dated June 22, 1976

Inventor(s) Jacob J. Epstein

It is certified that error appears in the above-identified patent and that said Letters Patent are hereby corrected as shown below:

Column 2, line 16, delete "of".

Column 4, line 11, "frozen" should read -- freshly --.

Column 6, line 8, "trying" should read -- tying --.

Column 7, line 44, delete "expensive,"

Column 8, line 8, "expensible" should read -- expensive --.

Signed and Sealed this

Twenty-second Day of February 1977

[SEAL]

Attest:

RUTH C. MASON
*Attesting Officer*

C. MARSHALL DANN
*Commissioner of Patents and Trademarks*